United States Patent [19]

Slee

[11] Patent Number: 4,646,595
[45] Date of Patent: Mar. 3, 1987

[54] MACHINE TOOLS
[75] Inventor: Roger H. Slee, Warwick, England
[73] Assignee: AE PLC, Warwickshire, England
[21] Appl. No.: 621,265
[22] Filed: Jun. 18, 1984
[30] Foreign Application Priority Data
  Jun. 16, 1983 [GB] United Kingdom ............... 8316428
[51] Int. Cl.$^4$ ........................... B23B 5/24; B23B 3/28
[52] U.S. Cl. ........................................ 82/2 B; 82/19;
                                                82/DIG. 9; 318/571
[58] Field of Search .......... 82/2 B, 19, 24 R, DIG. 9;
                                                                318/571

[56] References Cited
U.S. PATENT DOCUMENTS 3,174,404 3/1965 Findley ........................... 82/DIG. 9
3,753,384 8/1973 Anfindsen ........................... 409/293
4,203,062 5/1980 Bathen ................................. 82/2 B Primary Examiner—Leonidas Vlachos
Attorney, Agent, or Firm—Leydig, Voit & Mayer

[57] ABSTRACT

In a machine tool, the tool is moved using a signal representing a required profile of the surface being machined. This signal is fed to a transducer, such as a piezoelectric crystal or a D.C. linear motor, which converts the signal into a corresponding linear movement which is transmitted to the tool. The tool can also be vibrated ultrasonically during machining. Such machines can be used for producing workpieces which are non-circular in cross-section and/or which are barrelled or tapered along their length.

3 Claims, 5 Drawing Figures

MACHINE TOOLS

BACKGROUND TO THE INVENTION

1. Field of the Invention

The invention relates to machine tools for machining rotating workpieces and in particular to machine tools for machining rotating workpieces to have a non-cylindrical surface profile.

2. Review of the Prior Art

In a conventional machine tool, a tool is mounted on a tool holder which is carried on a slide moved by an electric motor via a lead screw. Such machine tools are capable of applying a wide range of cutting forces to a wide variety of workpieces.

It is a disadvantage of such conventional machine tools, however, that the inertia of the slide and the construction of the transmission by which the drive is transmitted from the motor to the slide limits severely the speed at which a rotating workpiece can be machined when the position of the tool has to be altered during machining. This is because, as the rotational speed of the workpiece is increased and/or as the speed of tool movement is increased, there is a speed at which the slide cannot react sufficiently quickly to positioning signals, so that the tool is not in a required position at a required time and so that the required profile is not machined. This is particularly true when the tool position is to be altered incrementally within a revolution of the workpiece or between revolutions.

SUMMARY OF THE INVENTION

According to the invention, there is provided a a machine tool for machining a workpiece to a non-uniform surface profile which requires machining movements of the tool within a revolution of relative rotation therebetween and comprising a control system for producing from data supplied thereto an electrical output signal which is a function of the required non-uniform surface profile of the workpiece being machined, and a transducer connected to the control system for converting the electrical output signal directly into corresponding linear movements and a tool connected directly to the transducer for linear movement thereby to machine the workpiece to the required non-uniform surface profile.

BRIEF DESCRIPTION OF THE DRAWINGS

Further novel features and/or combinations of features of the invention will become apparent from the following description, given by way of example, of two embodiments of machine tool, reference being made to the accompanying drawings in which.

DESCRIPTION OF THE PREFERRED EMBODIMENTS

Figure 1:
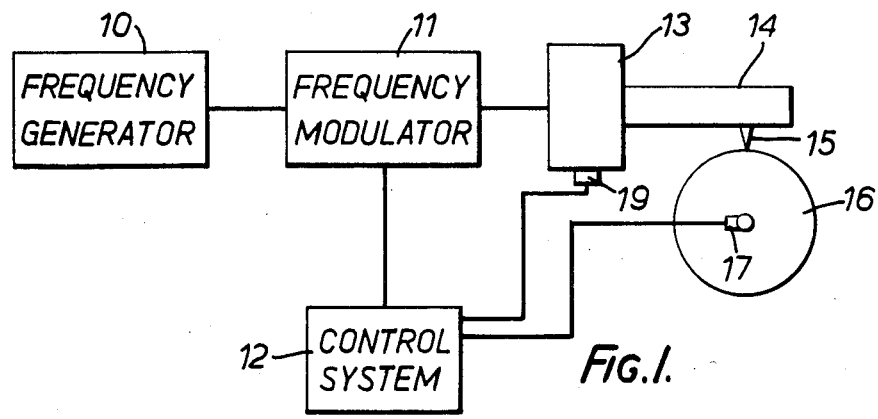
FIG. 1 is a schematic diagram of the first embodiment machine tool.
Figure 2:
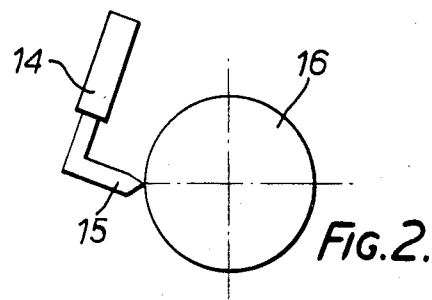
FIG. 2 is a schematic view of an alternative mounting for a tool of the machine tool of FIG. 1 in relation to the workpiece.

Referring first to FIGS. 1 and 2, the machine tool comprises a frequency generator 10 and a frequency modulator 11 receiving an input from a control system 12. The signal produced by the frequency modulator 11 is fed to an ultrasonic transducer 13 in the form of a piezoelectric crystal or crystals where the signal is converted into linear ultrasonic vibrations having a frequency related to the natural frequency of the crystal or crystals and with an amplitude dependent on the power of the signal. These linear vibrations are transmitted to a tool holder 14 carrying a tool 15 for machining a rotating workpiece 16 rotated by a drive 21. The tool holder 14 is connected to a drive 22 which moves the holder 14 in an axial direction along the workpiece 16 at a predetermined constant speed.

It will be appreciated, however, that the workpiece 16 could be stationary during machining and the tool 15 rotated around the workpiece 16 on a rotating head.

An angular sensor 17 produces a signal proportional to the angular position of the workpiece 16 during revolution and an axial sensor 19 produces a signal proportional to the axial position of the tool holder along the axis of rotation of the workpiece 16. These signals are provided as feedback to the control system 12.

The frequency generator 10 produces a signal whose frequency may be from 5 kHz to 100 kHz but is preferably of ultrasonic frequency eg. 15 kHz to 30 kHz. The maximum power of the signal may correspond to an ultrasonic power of about 5 kW. One of the primary effects of the application of vibrations of this frequency to the tool holder is to increase the cutting rate of the tool. The cutting rate (which is proportional to the amplitude of the ultrasonic vibrations and hence to the depth of cut, with other variables remaining constant) is proportional to the power of the signal applied to the ultrasonic transducer. Since this signal is of constant frequency, this means, in effect, that the depth of cut is proportional to the amplitude of the signal.

The control system 12 is fed, from an input device 23, with data relating to a required profile of the surface of the workpiece 16. The control system produces a continuous electrical output signal whose amplitude is proportional to a required radius of the workpiece at a required time (i.e. at a required angular position around the workpiece and at a required axial position along the workpiece). In the production of this signal, account is taken of the feedback signals from the sensors 17 and 18.

The profile signal from the control system 12 is used to modulate the ultrasonic frequency signal fed to the transducer 13. In this way, the instantaneous amplitude of the ultrasonic frequency signal is controlled to be proportional to the required radius of the workpiece at that moment in time so that the amplitude of movement of the tool is in accordance with this signal. Accordingly, the profile of the workpiece will be machined in accordance with the profile signal.

It will be appreciated that the control system 12 may produce a modulating signal whose amplitude varies within a revolution of the workpiece and/or whose amplitude varies between successive axial positions of the tool. Where there is variation of amplitude within a revolution, this may be a symmetrical variation in each half cycle or different variations in each half cycle or, indeed, in each quarter cycle or any other required variation. In this way, a machined workpiece, such as a piston or a bearing or a piston ring for an internal combustion engine, may be produced which is elliptical in cross-section or part circular and part elliptical in cross-section or any other required cross-sectional profile and which is additionally or alternatively barrelled or tapered or both along its axial length.

In addition, it is possible for the tool to machine a surface lying in a plane generally normal to the axis of rotation of the workpiece to provide a profile on said surface in which each point on said surface is a required axial distance from a reference plane.

There may be provided a succession of piezoelectric crystals to amplify the vibrations and additionally or alternatively a wave guide may be provided between the piezoelectric crystal or crystals and the tool to amplify the vibrations.

Although, as shown, the control system 12 applies the profile signal to the ultrasonic signal before its application to the transducer 13, it will be appreciated that the control system 12 may apply the profile signal to a second transducer on the tool holder 14.

The tool holder can be made to have very low weight and inertia and is very closely coupled to the transducer 13. In view of this, it is possible to revolve the workpiece at high speed, for example up to or above 3,000 revolutions per minute while effecting a number of accurate changes of the radial position of the tool accurately within a revolution. For example, the tool may move up to 10,000 Hz with a maximum movement of 0.1 mm. This allows exceptionally high production rates to be achieved while maintaining dimensional accuracy. In addition, the general benefits of ultrasonic machining are achieved. These include the reduction of tool force, so extending tool life, and improved surface finish.

In FIG. 1, the tool is shown applied to the workpiece in a radial direction. As shown in FIG. 2, however, the tool holder may be applied to the workpiece at an angle to a radial direction. This has been found to be an improved cutting angle which requires less power for the same depth of cut, since induced vibrations in the cleavage plane ahead of the tool nose greatly reduce the frictional heat and work done in chip formation.

It will be appreciated that the tool holder 14 will be mounted for movement independently of the ultrasonic system described above. This will allow the tool holder 14 to be moved to a starting position and may also be used for course adjustment of the tool position during machining.

Figure 3:
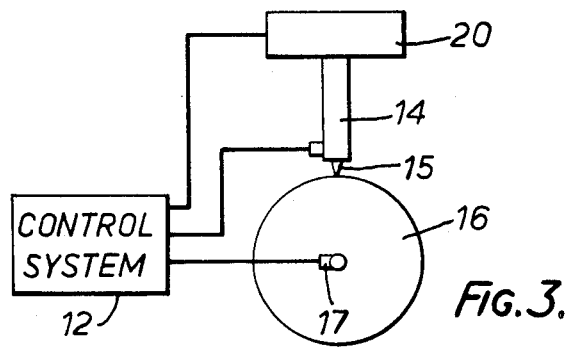
FIG. 3 is a schematic diagram of the second embodiment of machine tool.

Although the application of the ultrasonic signal gives the benefits referred to above, the presence of this signal is not essential. Referring next to FIG. 3, parts common to FIG. 3 and to FIGS. 1 and 2 will be given the same reference numerals and will not be described in detail. In this embodiment, the control system 12 produces the variable output signal as described with reference to FIGS. 1 and 2. This signal is applied direct to a piezoelectric transducer 20 which produces a linear movement in accordance with the output signal. This movement is transmitted to the tool 15 to cause the tool 15 to move in accordance with the output signal.

It will be appreciated that the piezoelectric transducer 20 may be substituted by any other transducer capable of converting the electrical output signal into corresponding mechanical movements of the tool at high speed to allow the machining of shaped workpieces at high speeds. Two embodiments of an example of such an alternative transducer are shown in FIGS. 4 to 6.

Figure 4:
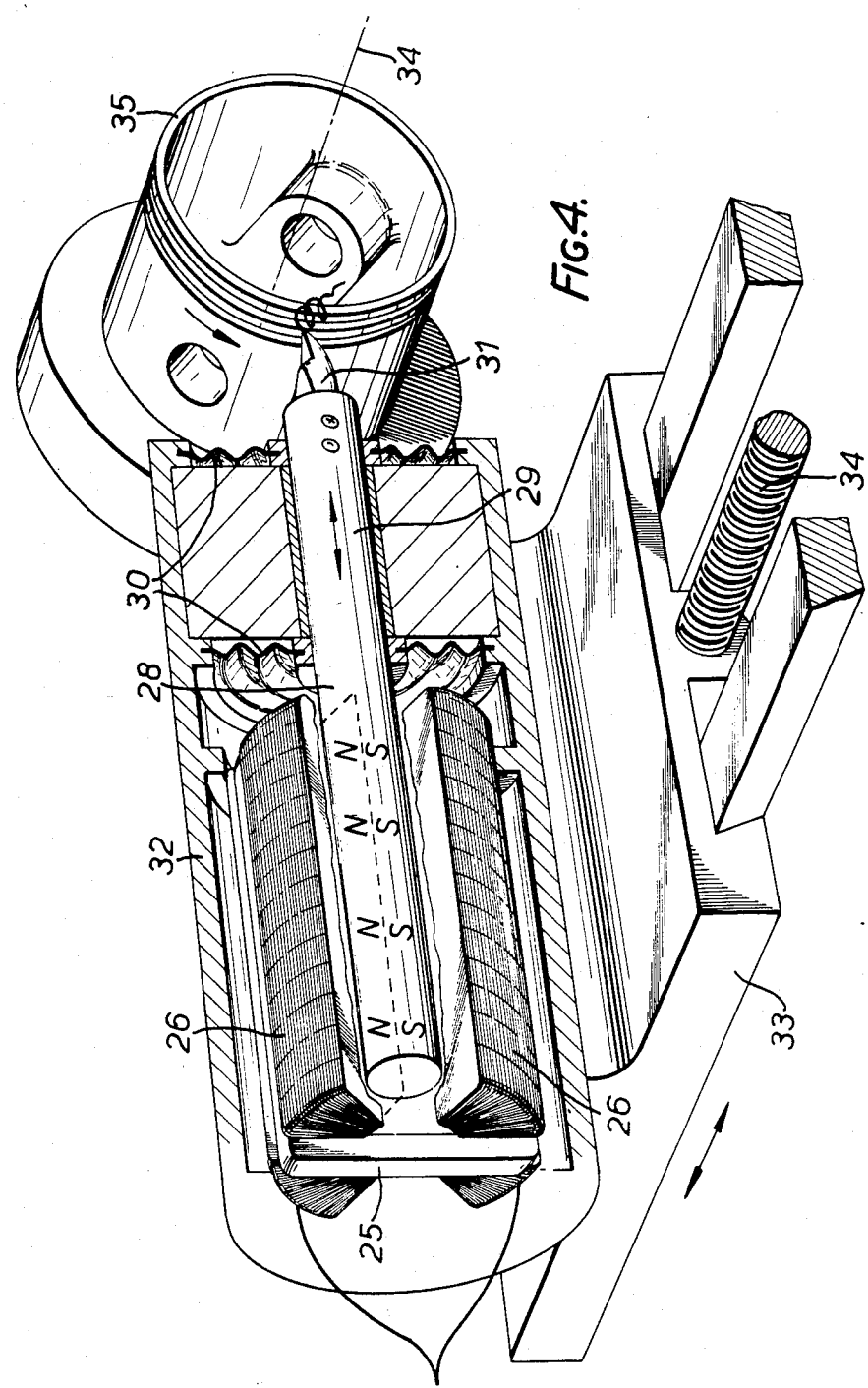
FIG. 4 is a perspective view of a first form of transducer for use with the machine tool of of FIG. 3, the transducer being in the form of a D.C. linear motor.
Figure 5:
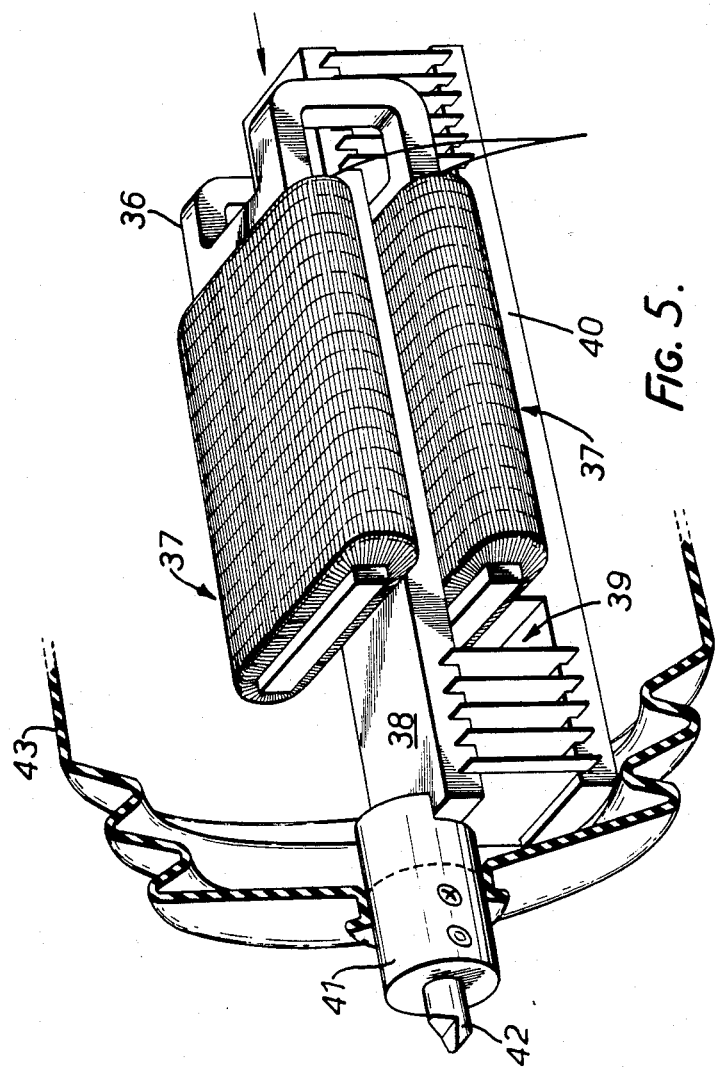
FIG. 5 is a perspective view of a second form of D.C. linear motor for use as a transducer in the machine tool of FIG. 1.

Referring first to FIG. 4, the first transducer is a D.C. linear motor comprising a generally U-shaped fixed core 25 with the limbs of the U being of part-cylindrical shape about a common axis. Stator coils 26 are wound on each of these limbs. A rod-like movable permanent magnet 28 is arranged between, and co-axially with, the part-cylindrical U-shaped limbs. An extension 29 of this rod-like member 28 is carried in a bearing, which may be formed by a pair of diaphragms 30 or may be a magnetic bearing or an air bearing. A tool 31 is carried at the end of the rod extension 29 remote from the stator coils 26.

This D.C. linear motor assembly is contained with a casing 32 which is carried on a tool slide 33 movable through a lead screw 34 and a motor (not shown). The D.C. linear motor is mounted so that the movable rod-like permanent magnet 28 extends in a direction normal to the axis of rotation 34 of a workpiece 35, here shown as a piston for an internal combustion engine. This slide 33 is arranged to be movable in a direction parallel to the axis of rotation 34 of the workpiece.

In use, the stator coils are connected to the control system shown in FIG. 3 with feedback being provided by sensors of the kind shown in FIG. 3. The workpiece 35 is rotated and the lead screw 34 rotated to move the tool 31 at a constant speed in an axial direction along the surface of the workpiece 35. The signals fed from the control system to the stator coils 26 cause the rod-like permanent magnet member 28 to move in the bearing to a position corresponding to the applied signal, so that the tool 31 is moved to an instantaneous required radial position to machine a required profile on the workpiece.

The low inertia, high acceleration and high force of such a D.C. linear motor allow it to machine workpieces at high speed, with the tool position changing many times with a revolution of the workpiece.

The diaphragms 30 provide a tool positioning device which tends to return the tool 31 to a datum position in the absence of a positioning signal.

It will be appreciated that none of the tool forces, which may vary from 5 to 25 kg, are taken by the linear motor; all these forces are taken by the diaphragms 30. This means that the linear motor does not have to be sufficiently large to damp out unwanted oscillations of the tool holder during its movement; these are dealt with by the diaphragms 30. Thus the inertia of the permanent magnet member 28 can be kept to a minimum; so increasing the speed of the response.

In addition, it will be appreciated that since the force moving the tool holder is applied magnetically, there are no frictional forces between the tool holder and its drive which would tend to slow the response time of the tool actuator.

An alternative form of linear motor transducer is shown in FIG. 5. In this embodiment, a D.C. linear motor comprises a generally U-shaped fixed core 36 with stator coils 37 would on each limb of the U. A flat permanent magnetic moving member 38 extends between the limbs of the U-shape core and through the base of the U. This member 38 is supported at each of its ends by a plurality of flexible plates 39 carried on a base 40 and lying in planes normal to the length of the member 38, so that the member 38 has limited movement in the direction of its length and is subject to a restoring force from the plates 39 which tends to return the member 38 to a datum position. A tool holder 41 is mounted at one end of the permanent magnet member 38 and holds a tool 42. A flexible cover 43 extends around and over the linear motor to shield it from dust and metal chips.

In use, the D.C. linear motor of FIG. 5 is mounted on a slide in the same way as the linear motor of FIG. 4. The stator coils 37 are connected to the control system of FIG. 3 and the tool is controlled to machine a workpiece (not shown) in the same way as the tool of the embodiment of FIG. 4.

I claim:

1. A machine tool for machining a rotating workpiece to a non-uniform surface profile which requires machining movements of the tool within a revolution of relative rotation therebetween, and comprising:
   a workpiece drive for rotating a workpiece,
   a tool for machining a surface of the workpiece,
   a tool holder carrying said tool and moving said tool in a direction towards and away from the surface of the workpiece to machine said profile,
   drive means moving the tool holder in a direction normal to the direction of movement of the tool, to traverse the tool over the surface,
   piezo-electric transducer means connected to the tool imparting oscillating movement to said tool towards and away from the workpiece,
   angular position transducer means producing a signal representing the angular position of the workpiece,
   axial position transducer means producing a signal representing the axial position of the tool relative to the workpiece,
   input means producing data corresponding to a required non-uniform profile of the workpiece,
   control means connected to said input means and to said angular position transducer means and said axial position transducer means and producing from said data supplied thereto by said input means and said angular position transducer means and said axial position transducer means, an analogue profile signal corresponding to said required non-uniform profile of the workpiece defined by said data,
   oscillating signal means producing a continuous signal of constant frequency, and
   modulating means connected to said control means and to said oscillating signal means for modulating said constant frequency signal with said analogue profile signal, and connected to said piezo-electric means whereby said tool holder and said tool are oscillated at a variable amplitude in accordance with said analogue profile signal to machine ultrasonically the workpiece to said profile.

2. A machine tool according to claim 1, wherein an angular sensor is provided which produces a signal proportional to the angular position of the workpiece during rotation thereof, said angular position sensor being connected to the control system as feedback.

3. A machine tool according to claim 1, wherein an axial position sensor is provided producing a signal proportional to the axial position of the tool holder and on the axis of rotation of the workpiece, said axial sensor being connected to said control system to provide a feedback signal.

* * * * *